(12) United States Patent
Itkin et al.

(10) Patent No.: US 10,146,721 B2
(45) Date of Patent: Dec. 4, 2018

(54) REMOTE HOST MANAGEMENT OVER A NETWORK

(71) Applicant: Mellanox Technologies Ltd., Yokneam (IL)

(72) Inventors: Yuval Itkin, Zoran (IL); Liran Liss, Atzmon (IL); Amir Ancel, Kibbutz Moran (IL); Ran Sofer, Givat Shmuel (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 309 days.

(21) Appl. No.: 15/051,750

(22) Filed: Feb. 24, 2016

(65) Prior Publication Data

US 2017/0242819 A1    Aug. 24, 2017

(51) Int. Cl.
| | | |
|---|---|---|
| *G06F 15/173* | (2006.01) | |
| *G06F 13/42* | (2006.01) | |
| *G06F 13/36* | (2006.01) | |
| *G06F 13/40* | (2006.01) | |

(52) U.S. Cl.
CPC .............. *G06F 13/42* (2013.01); *G06F 13/36* (2013.01); *G06F 13/4027* (2013.01)

(58) Field of Classification Search
CPC .................................................... G06F 15/173
See application file for complete search history.

(56) References Cited

U.S. PATENT DOCUMENTS

| 6,367,035 B1 | 4/2002 | White | |
|---|---|---|---|
| 8,542,689 B2 | 9/2013 | Davis | |
| 8,705,545 B2 * | 4/2014 | Reed | ...................... H04L 69/167 |
| | | | 370/392 |
| 9,872,205 B2 * | 1/2018 | Shah | ...................... H04W 28/14 |

(Continued)

FOREIGN PATENT DOCUMENTS

CN    106227636 A    12/2016

OTHER PUBLICATIONS

InfiniBand TM Architecture Specification, vol. 1, Release 1.2.1, 1727 pages, Nov. 2007 Copyright.

(Continued)

*Primary Examiner* — Farley Abad
(74) *Attorney, Agent, or Firm* — D. Kligler IP Services Ltd.

(57) ABSTRACT

A method for management of a host computer that includes a management controller configured to carry out, independently of the host CPU, host management instructions contained in management packets compliant with a first data link protocol. The method includes receiving the management packets from a first network operating in accordance with the first data link protocol. The management packets are encapsulated in data packets compliant with a second data link protocol, different from the first data link protocol. The data packets are transmitted to a second network, operating in accordance with the second data link protocol. The transmitted data packets are received from the second network in a network interface controller (NIC), which is (Continued)

installed in the host computer and connected to the second network. The NIC decapsulates the management packets from the received data packets and passes the decapsulated management packets via a sideband connection to the management controller.

18 Claims, 2 Drawing Sheets

(56) References Cited

U.S. PATENT DOCUMENTS

| | | |
|---|---|---|
| 2002/0162026 A1 | 10/2002 | Neuman et al. |
| 2003/0026260 A1* | 2/2003 | Ogasawara ......... H04L 12/4633 370/392 |
| 2003/0145045 A1* | 7/2003 | Pellegrino ............. G06F 3/0601 709/203 |
| 2008/0005222 A1* | 1/2008 | Lambert ............... G06F 3/0227 709/203 |
| 2011/0040917 A1 | 2/2011 | Lambert et al. |
| 2014/0258738 A1* | 9/2014 | Greenwalt ............ G06F 1/3206 713/300 |
| 2015/0172112 A1 | 6/2015 | Itkin et al. |
| 2015/0215343 A1 | 7/2015 | Itkin et al. |
| 2016/0248619 A1 | 8/2016 | Itkin |
| 2016/0248620 A1 | 8/2016 | Itkin |

OTHER PUBLICATIONS

PCI Express® Base Specification, Revision 3.1, 1073 pages, Mar. 2014.

European Application # 17209619 search report dated Feb. 8, 2018.

Intel., "Pro/1000 PT Dual Port Server Adapter", 4 pages, Jan. 1, 2006.

Anonymous., "NIC with embedded firewall", Geek.com, 9 pages, Apr. 29, 2002.

Anonymous., "Intelligent Platform Management Interface", Wikipedia, 8 pages, Dec. 10, 2016.

DMTF DSP0222, "Network Controller Sideband Interface (NC-SI) Specification", version 1.1.0, 138 pages, Sep. 23, 2015.

Intel, "NC-SI Overview and Performance", Revision 1.1, 27 pages, Mar. 2013.

* cited by examiner

REMOTE HOST MANAGEMENT OVER A NETWORK

FIELD OF THE INVENTION

The present invention relates generally to computer systems, and particularly to methods and systems for remote management of computers over a network.

BACKGROUND

Various techniques for remote management of a host computer are known in the art. For example, U.S. Pat. No. 6,367,035 describes methods and apparatus for diagnosing and correcting faults in a host computer having a central processing unit (CPU) and ancillary units. The apparatus is in two parts: a first part in the form of a service card to be coupled to the host computer and operable to disable the CPU and operate and/or interrogate the ancillary units, and a second part in the form of a remote support station to be coupled to the first part and operable to diagnose faults in the computer through the first part and to effect at least some corrective measures through the first part. The first and second parts are located remote from each other and connected by a telecommunication link such as through modems.

The sorts of capabilities that were envisioned in the above patent have been standardized in the Intelligent Platform Management Interface (IPMI) specifications, which provide management and monitoring capabilities independently of the host CPU, firmware, and operating system. IPMI defines a set of interfaces used by system administrators for out-of-band management of computer systems and monitoring of their operation. IPMI enables the administrator to manage a computer, even when it is powered off or otherwise unresponsive, by using a network connection to a baseboard management controller (BMC) in the computer, rather than to the operating system or login shell. The BMC, which is typically implemented as a specialized microcontroller embedded on the motherboard of the computer, manages the interface between system management software and platform hardware.

SUMMARY

Embodiments of the present invention that are described hereinbelow provide systems and methods that enable remote management of a computer independently of the type of network to which the computer is connected.

There is therefore provided, in accordance with an embodiment of the invention, a system for management of a host computer that includes a central processing unit (CPU), a system memory, and a management controller configured to carry out, independently of the CPU, host management instructions contained in management packets compliant with a first data link protocol. The system includes a bridge, including a first network interface controller (NIC), which is configured to receive the management packets from a first network operating in accordance with the first data link protocol, and a second NIC, which is configured for connection to a second network, operating in accordance with a second data link protocol, different from the first data link protocol. Bridging logic in the bridge is configured to encapsulate the management packets in data packets compliant with the second data link protocol and to transmit the data packets via the second NIC to the second network. A third NIC, configured for installation in the host computer, includes a network interface configured to receive the data packets from the second network, and packet processing circuitry, which is configured to recognize the data packets encapsulating the management packets and to decapsulate and pass the management packets via a sideband connection to the management controller.

In some embodiments, the third NIC includes a host interface, which is separate from the sideband connection and is coupled to the CPU and system memory, and the third NIC is operative to transmit and receive, via the network interface, further packets conveying data between the system memory and other host computers on the second network. In a disclosed embodiment, the third NIC is configured to transmit and receive the further packets on multiple queue pairs (QPs) established between the host computer and the other host computers on the second network, while receiving the data packets from the bridge on another QP that is designated for conveying the management packets between the bridge and the third NIC. Typically, the third NIC is configured to establish communications with the second NIC on the designated QP independently of the CPU.

Typically, the host computer includes a main power rail, which supplies main power to the CPU and system memory, and an auxiliary power rail, which supplies auxiliary power to the management controller. In a disclosed embodiment, the third NIC is connected to receive the auxiliary power from the auxiliary power rail so as to decapsulate and pass the management packets via the sideband connection to the management controller even when the CPU is powered down. In one embodiment, the third NIC is operative, when the CPU is powered down, to wake the CPU in response to an instruction transmitted via the bridge to the third NIC.

In some embodiments, the packet processing circuitry is configured to receive, via the sideband connection, further management packets from the management controller, to encapsulate the further management packets, and to transmit the encapsulated further management packets via the network interface, over the second network to the second NIC, for decapsulation by the bridging logic and delivery to the first network.

Additionally or alternatively, the bridging logic is configured to transmit the data packets encapsulating the management packets to multiple host computers on the second network, while serving as a proxy on the first network for the multiple host computers.

In some embodiments, the first data link protocol is an Ethernet protocol, while the second data link protocol is an InfiniBand protocol. In a disclosed embodiment, the management controller includes a baseboard management controller (BMC), and the management packets are transmitted to the BMC in accordance with an Intelligent Platform Management Interface (IPMI). Additionally or alternatively, the data packets encapsulating the management packets are transmitted on the second network as unreliable datagram packets in accordance with the InfiniBand protocol.

There is also provided, in accordance with an embodiment of the invention, a method for management of a host computer that includes a central processing unit (CPU), a system memory, and a management controller configured to carry out, independently of the CPU, host management instructions contained in management packets compliant with a first data link protocol. The method includes receiving the management packets from a first network operating in accordance with the first data link protocol. The management packets are encapsulated in data packets compliant with a second data link protocol, different from the first data link protocol. The data packets are transmitted to a second network, operating in accordance with the second data link protocol. The transmitted data packets are received from the second network in a network interface controller (NIC), which is installed in the host computer and connected to the second network. The management packets are decapsulated in the NIC from the received data packets. The decapsulated management packets are passed from the NIC via a sideband connection to the management controller.

The present invention will be more fully understood from the following detailed description of the embodiments thereof, taken together with the drawings in which:

DETAILED DESCRIPTION OF EMBODIMENTS

Figure 1:
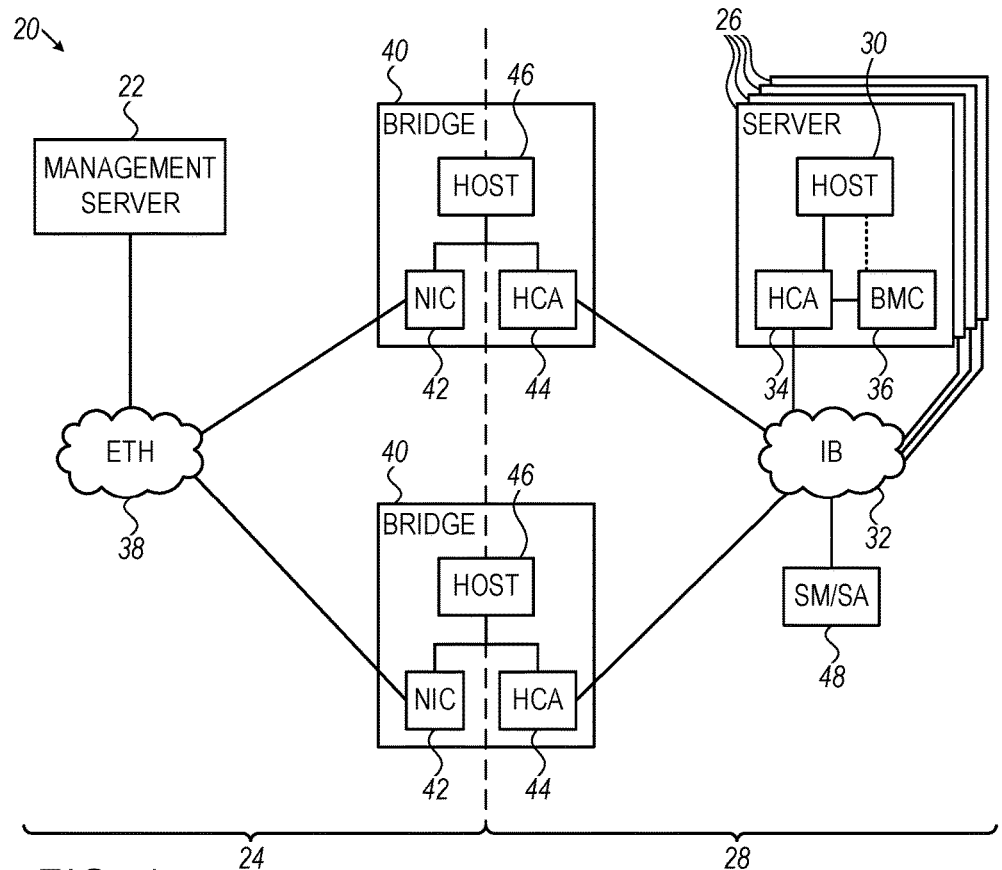
FIG. 1 is a block diagram that schematically illustrates a computer system, in accordance with an embodiment of the invention.

Standardized BMC devices and management protocols, such as the above-mentioned IPMI, are designed to operate over Ethernet networks. Consequently, when the sorts of management services that these devices and protocols can provide are needed for servers in a different network environment, such as an InfiniBand network, the system operator is faced with a dilemma: either to develop and set up a non-standard management solution, customized for the non-Ethernet network environment, or to deploy an Ethernet network for management purposes alongside the non-Ethernet network that is used for data exchange among the servers. Both of these options are costly and complicated.

Embodiments of the present invention that are described herein provide an alternative solution, which takes advantage of standard, Ethernet-based management controllers and protocols, while conveying management communication traffic over a non-Ethernet network. More generally, these embodiments may be applied in carrying management traffic that is transmitted over a first network, operating in accordance with a first data link protocol (which may be Ethernet or any other suitable protocol), over another, second network, operating in accordance with a second, different data link protocol (such as InfiniBand or Fibre Channel, for example). For the sake of simplicity and clarity, however, the embodiments described below relate specifically to conveying Ethernet-based management traffic over an InfiniBand network.

The disclosed embodiments use a bridge between the first and second networks (or multiple bridges for purposes of load sharing and redundancy). The bridge comprises a first network interface controller (NIC), which is connected to the first network and receives management packets from a management server on the first network, and a second NIC, connected to the second network. Bridging logic, which may be implemented in hardware and/or software within the bridge, encapsulates the management packets from the first network in data packets compliant with the second data link protocol, and transmits the data packets via the second NIC to host computers on the second network. The bridging logic similarly decapsulates management response packets from data packets transmitted by the host computers over the second network for transmission over the first network to the management server. The bridge thus serves as a proxy on the first network for the host computers on the second network. Similarly, the same bridge serves as a proxy on the second network for the management server(s) on the first network.

To handle the encapsulated management packets, the NIC that is installed in each managed host computer comprises packet processing logic that recognizes incoming data packets that encapsulate management packets. This logic decapsulates and passes the management packets via a sideband connection to a management controller in the host computer. This same NIC comprises a host interface, which is separate from the sideband connection, and is used for exchange of application data and other process-to-process communications to and from the CPU and system memory of the host computer. Thus, this NIC transmits and receives packets conveying data between the system memory and other host computers on the second network, in addition to the encapsulated management traffic conveyed in data packets over the second network to and from the bridge. The sideband connection between the NIC and management controller is separate and independent from the host interface and enables the management controller to communicate with the management server, via the NIC and the bridge, even when the CPU and other components of the host computer are inoperative.

FIG. 1 is a block diagram that schematically illustrates a computer system 20, in accordance with an embodiment of the invention. System 20 comprises a management server 22, which operates in an Ethernet domain 24 and manages multiple servers 26, which are deployed in an InfiniBand domain 28. Servers 26 are host computers, each of which comprises a host complex 30 and is connected to an InfiniBand network by a host channel adapter (HCA) 34, which is the term used to denote a NIC in the InfiniBand environment. Servers 26 also comprise a BMC 36, which is connected to HCA 34 by a sideband channel. Management server 22 communicates with BMC 36 via this sideband channel, as described further hereinbelow, in order to perform management functions on server 26 independently of the host CPU, possibly including waking host complex 30 from sleep states.

Management server 22 communicates with BMC 36 by transmitting management packets over an Ethernet network 38 to a bridge 40, which bridges between domains 24 and 28. The management packets sent from management server 22 to servers 26 and comply in form with the Ethernet protocol and have headers with destination addresses corresponding to the BMCs of the corresponding servers 26. Similarly, the management packets sent from BMCs 36 of servers 26 to management server 22 comply in form with the Ethernet protocol and have headers with a destination address corresponding to management server 22. Bridge 40 presents itself on network 38 as the path for forwarding to these destination addresses, in accordance with the Ethernet bridging protocol (although in fact, the bridge terminates and encapsulates the Ethernet packets and then forwards the encapsulated packets, rather than forwarding the actual Ethernet packets as-is). The content of the management packets is determined in accordance with the applicable management standard, such as the above-mentioned IPMI or the Redfish API promulgated by the Distributed Management Task Force, Inc. (DMTF), for example. As noted earlier, system 20 may comprise multiple, parallel bridges 40, to facilitate high availability and high bandwidth in communication with servers 26. In this case, each bridge 40 will serve as the forwarding path for a certain group of servers 26 and will receive the management packets from management server that are directed to the servers 26 in its group. In other words, either bridge serves as a proxy on network 38 for multiple servers 26 on network 32.

Each bridge 40 comprises at least one NIC 42, which is connected to Ethernet network 38 and operates in accordance with the Ethernet data link protocol, and at least one HCA 44, which is connected to InfiniBand network 32 and operates in accordance with the InfiniBand data link protocol (as well as higher-level protocols). NIC 42 presents itself on network 38 as a port of an Ethernet bridge for forwarding to the destination addresses of the management packets, as explained above. To transmit and receive the encapsulated management packets on network 32, HCA 44 opens one or more queue pairs (QPs) for communication with HCAs 34 of servers 26. These QPs are typically dedicated to management traffic, so that HCA 34 is able to recognize the corresponding data packets immediately upon receipt, based on their QP number, as containing management packets, and thus can decapsulate and pass the management packets directly via the sideband channel to BMC 36. HCAs 34 and 44 set up these management QPs autonomously, with the assistance of a subnet manager/subnet administration function (SM/SA) 48 on network 32, independently of the host CPUs in host complex 30. This communication setup procedure is described in detail hereinbelow with reference to FIG. 3.

Within bridge 40, bridging logic 46 is connected between NIC 42 and HCA 44 and is responsible for encapsulating the Ethernet management packets received from server 22 via NIC 42 into InfiniBand data packets, and transmitting these InfiniBand data packets via HCA 44 and network 32 to HCA 34 of the appropriate server 26. In the opposite direction, HCA 34 in servers 26 encapsulates management packets generated by BMC 32 in InfiniBand packets and transmits them to HCA 44 of bridge 40. Bridging logic 46 then decapsulates these packets and transmits the management packets via NIC 42 to management server 22. Bridging logic 46 typically comprises a host processor, which is programmed in software to carry out the packet processing and communication functions that are described herein. Alternatively or additionally, at least some of the functions of bridging logic 46 may be implemented in dedicate or programmable hardware logic. Further alternatively or additionally, bridge 40 may include embedded functionality of management server 22, which may be implemented in bridging logic 46.

In an embodiment of the present invention, the encapsulating InfiniBand data packet has the following form:

| LRH | GRH | BTH | DETH | HMH | Management packet | CRC |
|---|---|---|---|---|---|---|
| | | | | | Eth HDR   Instruction | |

The four header fields (LRH, GRH, BTH and DETH) are standard InfiniBand headers, as is the CRC footer of the packet. Specifically, LRH and GRH are the local and global routing headers, while BTH and DETH are the basic and datagram extended transport headers, and CRC represents one or more cyclic redundancy check fields. The BTH specifies the QP number and transport type, for example, InfiniBand SEND transport using unreliable datagram (UD) packets. (Reliability of communications is handled at the level of the management protocol between management server 22 and BMC 36.) Alternatively, other suitable packet formats and transport types can be used for the encapsulating packets, depending on system and network requirements.

The payload of the data packet, set off by double bars in the diagram above, contains the original Ethernet management packet and, optionally, a host management header (HMH). The value of the HMH can be composed and parsed by HCAs 34 and 44 to indicate the message type, including a default type for encapsulated management packets. Other types of messages can be defined for status reports and other management-related communications, but these specific protocol features are beyond the scope of this disclosure. The management packet itself, as shown above, comprises an Ethernet header (Eth HDR) and management instructions, which are conveyed substantially without change within the encapsulating packets. Management server 22 and BMC 36 are thus able to communicate with one another as though they were both connected to the same Ethernet network, using the communication tunnel established between HCAs 34 and 44.

Figure 2:
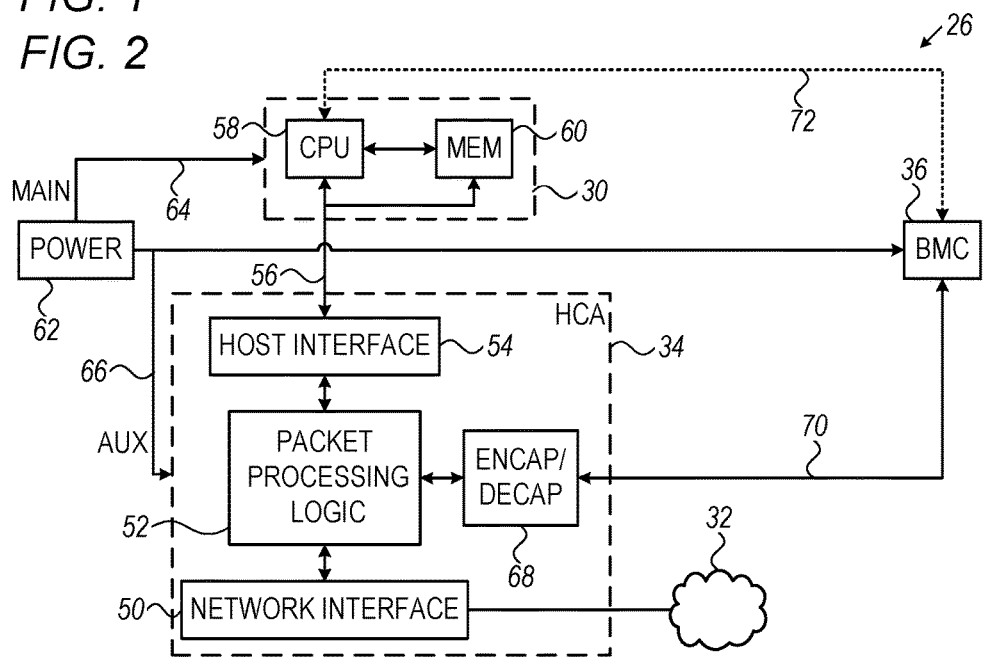
FIG. 2 is a block diagram that schematically shows elements of a host computer, in accordance with an embodiment of the invention.

FIG. 2 is a block diagram that schematically shows details of server 26, in accordance with an embodiment of the invention. HCA 34 comprises a network interface 50, which connects to InfiniBand network 32, and a host interface 54, connecting via a peripheral component bus 56, such as a PCI Express® (PCIe®) bus, to host complex 30. The host complex comprises a central processing unit (CPU) 58 and system memory 60, as well as other components that are known in the art. Packet processing logic 52 in HCA normally receives and processes incoming packets on multiple QPs from other servers 26 on network 32, and passes the packet payloads to memory 60 for processing by processes running on CPU 58, and similarly generates and transmits packets to the other servers on network 32. The specifics of these packet processing and communication functions are known in the art and are beyond the scope of the present disclosure.

In addition, as explained above, packet processing logic 52 sets up at least one QP that is designated for transmitting and receiving encapsulated management packets to and from bridge 40. Packet processing logic 52 recognizes data packets received from network 32 on this designated QP as packets that encapsulate management packets, and passes these packets to encapsulation/decapsulation logic 68. (Packet processing logic 52 and encapsulation/decapsulation logic 68 are collectively referred to herein as "packet processing circuitry.") The decapsulation logic decapsulates and passes the management packets via a sideband connection 70 to BMC 36. Logic 68 similarly receives, via sideband connection 70, management response packets from BMC 36, and encapsulates the management response packets in InfiniBand data packets. Packet processing logic 52 transmits these packets over the appropriate management QP, via network interface 50 and network 32 to bridge 40, for decapsulation and delivery to network 38. Encapsulation/decapsulation logic 68 typically comprises dedicated or programmable logic circuits for purposes of basic packet handling, and may in addition comprise an embedded processor, which is programmed in software or firmware to perform other management functions. Additionally, logic 68 may include detection logic for detection of encapsulated "magic packets," to enable detection of wake-on-LAN (WOL) packets carried over the management QP.

Server 26 also comprises a power supply 62, which feeds a main power rail 64 to supply operating power to host complex 30 (including CPU 58 and system memory 60), and an auxiliary power rail 66, which supplies auxiliary power to other elements of server 26 even when the host complex is powered down. Auxiliary power rail 66 supplies power, inter alia, to BMC 36 and HCA 34. As a result, even when CPU 58 is powered down, in a sleep state for example, HCA 34 is able to receive, decapsulate, and pass management packets via sideband connection 70 to BMC 36. BMC 36 is connected by a management bus 72 to host complex 30, and is thus able to wake server 26 when instructed to do so by instructions conveyed in management packets over network 32. System 20 can thus provide "wake on LAN" functionality over an InfiniBand infrastructure.

Figure 3:
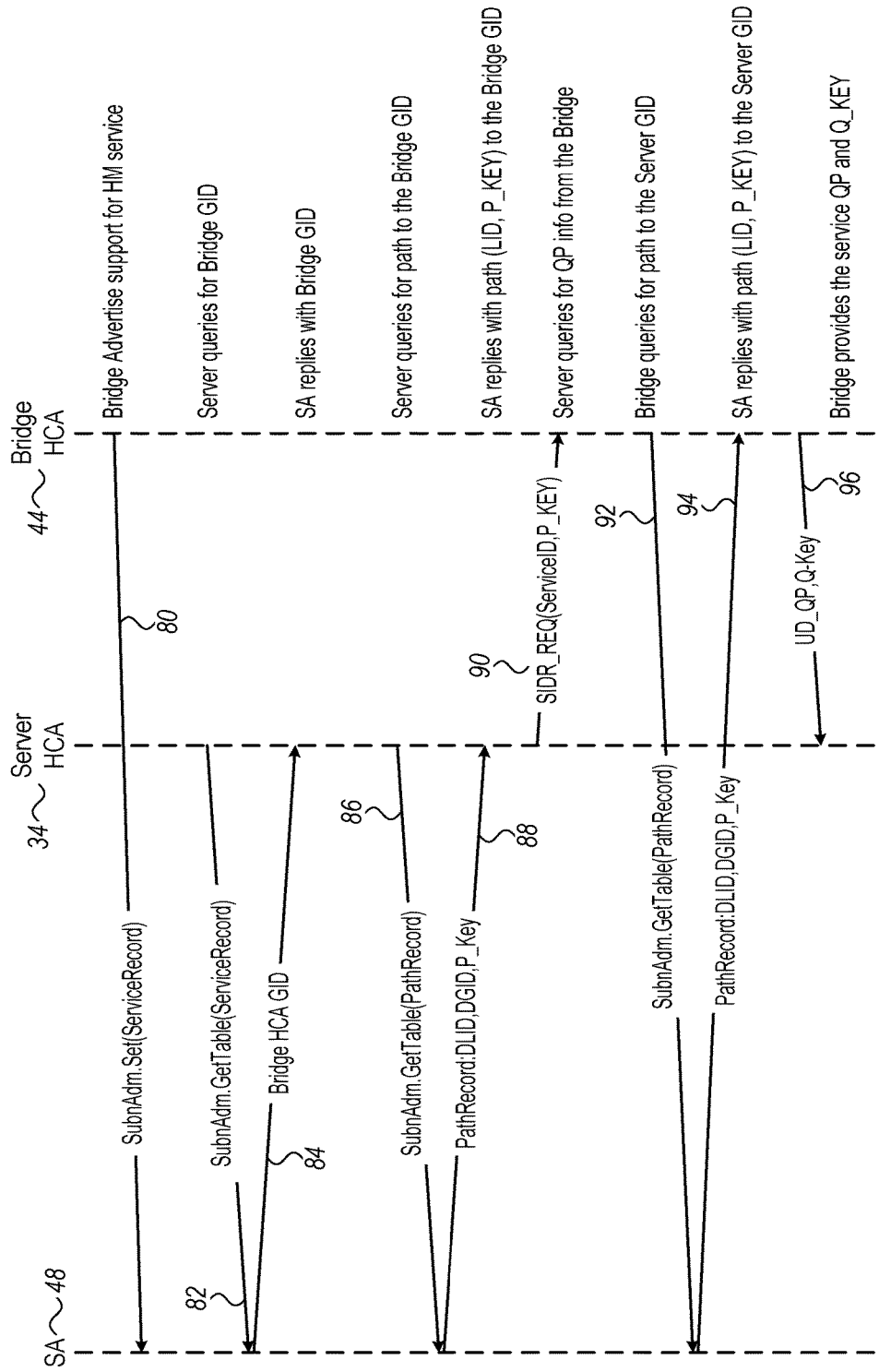
FIG. 3 is a ladder diagram that schematically illustrates a method for configuring a host management service, in accordance with an embodiment of the invention.

FIG. 3 is a ladder diagram that schematically illustrates a method for configuring a host management service, in accordance with an embodiment of the invention. This method enables HCA 44 in bridge 40 to establish management communications on a designated QP with HCA 34 in server 26 independently of CPU 58 in the server. The method is carried out with the assistance of SM/SA 48, and specifically of the subnet administration (SA) component, which is a standard logical element of the InfiniBand architecture, responsible for assigning addresses and distributing forwarding information within the network. SM/SA 48 typically runs in software either on one of servers 26 or on a dedicated processing node in network 32.

Bridge 40 initiates the method of FIG. 3 by transmitting, via HCA 44, an advertisement 80 to SM/SA 48 of its availability to support the host management (HM) service provided by server 22. The advertisement typically includes the address of HCA 44, expressed as the global identifier (GID, which is the Layer 3 address according to the InfiniBand protocol); partition key (PKEY); and service parameters (such as service name and service ID) of the HM service. SM/SA 48 creates a record of the service in response to the advertisement.

When BMC 36 subsequently prompts HCA 34 in a given server 26 to connect to the HM service, HCA 34 submits a query 82 to SM/SA 48 to provide the address of the service. SM/SA 48 consults its service record and accordingly returns a response 84 containing the GID of HCA 44. To establish communications with this GID, HCA 34 submits a path query 86 to SM/SA 48, which responds with the required path parameters 88, including the destination local identifier (DLID, which is the Layer 2 destination address) and PKEY.

HCA 34 can now use path parameters 88 in submitting a QP request 90 to HCA 44, specifying the service that is requested and the PKEY. Upon receiving this request, HCA 44 in bridge 40 submits a path query 92 of its own to SM/SA 48, and in return receives path parameters 94 needed to communicate with HCA 34 of server 26, including the DLID and PKEY corresponding to the GID of server 26. Using these parameters, bridge HCA 44 now returns a QP response 96 to server HCA 34, including the QP number and key (QKEY) assigned to the host management service. At this point, server HCA 34 and bridge HCA 44 have sufficient information to exchange data packets on the designated QP, and can use these data packets to encapsulate management packets exchanged between server 22 and BMC 36. Typically, although not necessarily, unreliable datagrams (UD) are used for this purpose.

Although the description above relates to specific features of InfiniBand networks that can be used in conveying tunneled Ethernet management traffic between a management server and management controllers, the principles of the present invention may similarly be applied, mutatis mutandis, in tunneling management traffic (based on both Ethernet and other data link protocols), over networks operating in accordance with other protocols. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A system for management of a host computer that includes a central processing unit (CPU), a system memory, and a management controller configured to carry out, independently of the CPU, host management instructions contained in management packets compliant with a first data link protocol, the system comprising:
   a bridge, comprising:
      a first network interface controller (NIC), which is configured to receive the management packets from a first network operating in accordance with the first data link protocol;
      a second NIC, which is configured for connection to a second network, operating in accordance with a second data link protocol, different from the first data link protocol; and
      bridging logic, which is configured to encapsulate the management packets in data packets compliant with the second data link protocol and to transmit the data packets via the second NIC to the second network; and
   a third NIC, configured for installation in the host computer and comprising:
      a network interface configured to receive the data packets from the second network;
      packet processing circuitry, which is configured to recognize the data packets encapsulating the management packets and to decapsulate and pass the management packets via a sideband connection to the management controller; and
      a host interface, which is separate from the sideband connection and is coupled to the CPU and system memory, wherein the third NIC is operative to transmit and receive, via the network interface, further packets conveying data between the system memory and other host computers on the second network,
   wherein the third NIC is configured to transmit and receive the further packets on multiple queue pairs (QPs) established between the host computer and the other host computers on the second network, while receiving the data packets from the bridge on another QP that is designated for conveying the management packets between the bridge and the third NIC.

2. The system according to claim 1, wherein the third NIC is operative to establish communications with the second NIC on the designated QP independently of the CPU.

3. The system according to claim 1, wherein the host computer includes a main power rail, which supplies main power to the CPU and system memory, and an auxiliary power rail, which supplies auxiliary power to the management controller, and wherein the third NIC is connected to receive the auxiliary power from the auxiliary power rail so as to decapsulate and pass the management packets via the sideband connection to the management controller even when the CPU is powered down.

4. The system according to claim 3, wherein the third NIC is operative, when the CPU is powered down, to wake the CPU in response to an instruction transmitted via the bridge to the third NIC.

5. The system according to claim 1, wherein the packet processing circuitry is configured to receive, via the sideband connection, further management packets from the management controller, to encapsulate the further management packets, and to transmit the encapsulated further management packets via the network interface, over the second network to the second NIC, for decapsulation by the bridging logic and delivery to the first network.

6. The system according to claim 1, wherein the bridging logic is configured to transmit the data packets encapsulating the management packets to multiple host computers on the second network, while serving as a proxy on the first network for the multiple host computers.

7. The system according to claim 1, wherein the first data link protocol is an Ethernet protocol, while the second data link protocol is an InfiniBand protocol.

8. The system according to claim 7, wherein the management controller comprises a baseboard management controller (BMC), and the management packets are transmitted to the BMC in accordance with an Intelligent Platform Management Interface (IPMI).

9. The system according to claim 7, wherein the data packets encapsulating the management packets are transmitted on the second network as unreliable datagram packets in accordance with the InfiniBand protocol.

10. A method for management of a host computer that includes a central processing unit (CPU), a system memory, and a management controller configured to carry out, independently of the CPU, host management instructions contained in management packets compliant with a first data link protocol, the method comprising:
receiving the management packets from a first network operating in accordance with the first data link protocol;
encapsulating the management packets in data packets compliant with a second data link protocol, different from the first data link protocol;
transmitting the data packets to a second network, operating in accordance with the second data link protocol;
receiving the transmitted data packets from the second network in a network interface controller (NIC), which is installed in the host computer and connected to the second network;
decapsulating the management packets, in the NIC, from the received data packets; and
passing the decapsulated management packets from the NIC via a sideband connection to the management controller,
wherein the NIC comprises a host interface, which is separate from the sideband connection and is coupled to the CPU and system memory, and
wherein the method comprises transmitting and receiving, by the NIC, further packets conveying data between the system memory and other host computers on the second network, and
wherein the further packets are transmitted and received on multiple queue pairs (QPs) established between the host computer and the other host computers on the second network, and wherein the data packets that encapsulate the management packets are received by the NIC on another QP that is designated for conveying the management packets.

11. The method according to claim 10, wherein receiving the transmitted data packets comprises establishing communications by the NIC on the designated QP independently of the CPU.

12. The method according to claim 10, wherein the host computer includes a main power rail, which supplies main power to the CPU and system memory, and an auxiliary power rail, which supplies auxiliary power to the management controller, and wherein the method comprises connecting the NIC to receive the auxiliary power from the auxiliary power rail so as to decapsulate and pass the management packets via the sideband connection to the management controller even when the CPU is powered down.

13. The method according to claim 12, wherein the method comprises, when the CPU is powered down, waking the CPU by the NIC in response to an instruction transmitted over the second network to the NIC.

14. The method according to claim 10, and comprising receiving in the NIC, via the sideband connection, further management packets from the management controller, encapsulating the further management packets in the NIC, and transmitting the encapsulated further management packets over the second network for decapsulation and delivery to the first network.

15. The method according to claim 10, wherein transmitting the data packets comprises transmitting the encapsulated management packets to multiple host computers on the second network, while serving as a proxy on the first network for the multiple host computers.

16. The method according to claim 10, wherein the first data link protocol is an Ethernet protocol, while the second data link protocol is an InfiniBand protocol.

17. The method according to claim 16, wherein the management controller comprises a baseboard management controller (BMC), and the management packets are transmitted to the BMC in accordance with an Intelligent Platform Management Interface (IPMI).

18. The method according to claim 16, wherein the data packets encapsulating the management packets are transmitted on the second network as unreliable datagram packets in accordance with the InfiniBand protocol.

* * * * *